(12) United States Patent
James et al.

(10) Patent No.: US 9,134,180 B2
(45) Date of Patent: Sep. 15, 2015

(54) DETECTOR

(75) Inventors: Timothy Andrew James, Middlesex (GB); Dave John Randall, Wootton Bassett (GB)

(73) Assignee: Thorn Security Limited, Middlesex (GB)

( * ) Notice: Subject to any disclaimer, the term of this patent is extended or adjusted under 35 U.S.C. 154(b) by 689 days.

(21) Appl. No.: 12/525,928

(22) PCT Filed: Nov. 20, 2007

(86) PCT No.: PCT/GB2007/004444
§ 371 (c)(1),
(2), (4) Date: Aug. 5, 2009

(87) PCT Pub. No.: WO2008/096100
PCT Pub. Date: Aug. 14, 2008

(65) Prior Publication Data
US 2010/0027583 A1 Feb. 4, 2010

(30) Foreign Application Priority Data
Feb. 6, 2007 (GB) .................................. 0702284.1

(51) Int. Cl.
*G01J 5/00* (2006.01)
*G01J 5/06* (2006.01)
*G01J 5/34* (2006.01)
*G01J 1/02* (2006.01)

(52) U.S. Cl.
CPC ............. *G01J 5/0014* (2013.01); *G01J 5/0018* (2013.01); *G01J 5/061* (2013.01); *G01J 5/34* (2013.01); *G01J 1/0252* (2013.01); *G01J 2005/063* (2013.01); *G01J 2005/068* (2013.01)

(58) Field of Classification Search
CPC ................. G01K 7/00; G01K 1/00; G01J 5/00
USPC ........... 374/4, 5, 57, 100, 141, 8, 1, 164, 185, 374/133–135, 29, 44, 208, 129, 39, 112, 374/148, 102, 137, 121, 107, 109; 702/1
See application file for complete search history.

(56) References Cited

U.S. PATENT DOCUMENTS

| | | | | |
|---|---|---|---|---|
| 3,463,008 | A | * | 8/1969 | Schrader et al. .............. 337/333 |
| 3,491,596 | A | * | 1/1970 | Dean ............................. 374/178 |
| 3,803,913 | A | * | 4/1974 | Tracer ........................ 73/204.14 |
| 4,115,998 | A | * | 9/1978 | Gilbert et al. .............. 60/39.091 |
| 4,117,527 | A | * | 9/1978 | Demarest et al. ............. 361/103 |
| 4,480,467 | A | * | 11/1984 | Harter et al. ............... 73/204.15 |
| 4,487,063 | A | * | 12/1984 | Hopper ...................... 73/204.19 |

(Continued)

FOREIGN PATENT DOCUMENTS

| | | | |
|---|---|---|---|
| DE | 102007057520 A1 | * | 6/2009 |
| GB | 2163008 A | * | 2/1986 |

(Continued)

*Primary Examiner* — Gail Kaplan Verbitsky
(74) *Attorney, Agent, or Firm* — Brinks Gilson & Lione

(57) ABSTRACT

A detector comprises a housing (1), a pyroelectric array sensor (2) mounted within the housing, a heater (4) associated with the pyroelectric array sensor, and control means (6) for varying the power supplied to the heater to control the temperature of the pyroelectric array sensor relative to the ambient temperature in order to minimise the rate of change of temperature of the pyroelectric array sensor and to keep a predetermined difference between the temperature of the pyroelectric array sensor and the ambient temperature.

23 Claims, 1 Drawing Sheet

(56) References Cited

U.S. PATENT DOCUMENTS

| | | | | |
|---|---|---|---|---|
| 4,501,952 | A | * | 2/1985 | Lehrke .................... 392/491 |
| 4,687,895 | A | * | 8/1987 | Chitre et al. ................ 219/701 |
| 4,723,066 | A | * | 2/1988 | Kurokawa et al. .......... 392/448 |
| 4,778,538 | A | * | 10/1988 | Lyman ...................... 136/230 |
| 4,785,289 | A | * | 11/1988 | Chen ......................... 340/527 |
| 4,793,553 | A | * | 12/1988 | Berman .................. 236/91 R |
| 4,884,443 | A | * | 12/1989 | Lee et al. ................ 73/204.16 |
| 4,893,315 | A | * | 1/1990 | Homer et al. ................ 374/37 |
| 4,900,162 | A | * | 2/1990 | Beckman et al. ........... 374/132 |
| 5,237,867 | A | * | 8/1993 | Cook, Jr. ................ 73/204.15 |
| 5,299,594 | A | * | 4/1994 | Lord et al. .............. 137/101.19 |
| 5,805,767 | A | * | 9/1998 | Jouas et al. ................. 392/373 |
| 5,860,741 | A | | 1/1999 | Tsao et al. |
| 6,177,271 | B1 | * | 1/2001 | Butts et al. ................ 435/303.1 |
| 6,515,283 | B1 | * | 2/2003 | Castleman et al. ....... 250/339.15 |
| 6,578,563 | B2 | * | 6/2003 | Hada et al. .................. 123/697 |
| 6,637,264 | B2 | * | 10/2003 | Lotters et al. ............. 73/204.27 |
| 6,658,931 | B1 | * | 12/2003 | Plumb et al. .............. 73/204.15 |
| 7,147,366 | B2 | * | 12/2006 | Melby et al. ...................... 374/1 |
| 7,214,909 | B2 | * | 5/2007 | Reiter et al. ............. 219/448.11 |
| 7,442,902 | B2 | * | 10/2008 | Stearns et al. ............... 219/490 |
| 7,535,711 | B2 | * | 5/2009 | Saegusa et al. ............. 361/695 |
| 7,578,613 | B2 | * | 8/2009 | Reading ........................ 374/30 |
| 7,728,263 | B2 | * | 6/2010 | Zhang et al. ................ 219/494 |
| 7,740,402 | B2 | * | 6/2010 | Camp ............................ 374/45 |
| 7,745,759 | B2 | * | 6/2010 | Long et al. .................. 219/214 |
| 7,849,931 | B2 | * | 12/2010 | Ng .................................. 169/62 |
| 8,021,039 | B2 | * | 9/2011 | Amato .......................... 374/141 |
| 8,638,215 | B2 | * | 1/2014 | Kates ........................... 340/521 |
| 2002/0011570 | A1 | * | 1/2002 | Castleman ............... 250/339.15 |
| 2002/0181544 | A1 | * | 12/2002 | Huang et al. ................. 374/205 |
| 2003/0006822 | A1 | * | 1/2003 | Murakami et al. ........... 327/513 |
| 2003/0097875 | A1 | * | 5/2003 | Lentz et al. ................ 73/204.26 |
| 2005/0110968 | A1 | * | 5/2005 | Aichi et al. ..................... 355/30 |
| 2005/0151306 | A1 | * | 7/2005 | Sokolowski et al. ........... 266/80 |
| 2006/0017578 | A1 | * | 1/2006 | Shubinsky et al. ........... 340/578 |
| 2006/0056481 | A1 | * | 3/2006 | Melby et al. ...................... 374/1 |
| 2006/0266943 | A1 | * | 11/2006 | Phelan, Jr. ................. 250/338.3 |
| 2006/0289457 | A1 | * | 12/2006 | Baecker et al. .............. 219/497 |
| 2007/0160108 | A1 | * | 7/2007 | Kent ............................... 374/54 |
| 2007/0182574 | A1 | * | 8/2007 | Dzurko et al. ................ 340/632 |
| 2007/0289976 | A1 | * | 12/2007 | Meyer et al. .............. 220/592.09 |
| 2008/0136651 | A1 | * | 6/2008 | Li et al. ......................... 340/589 |
| 2009/0296769 | A1 | * | 12/2009 | Fiennes et al. .................... 374/1 |
| 2011/0238456 | A1 | * | 9/2011 | Ray et al. ..................... 705/7.13 |
| 2012/0023987 | A1 | * | 2/2012 | Besore et al. .................. 62/157 |
| 2012/0115538 | A1 | * | 5/2012 | Kopikare ..................... 455/522 |

FOREIGN PATENT DOCUMENTS

| | | | |
|---|---|---|---|
| JP | 54101399 A | * | 8/1979 |
| JP | 2000183372 A | * | 6/2000 |
| WO | WO 9200508 A | * | 1/1992 |

* cited by examiner

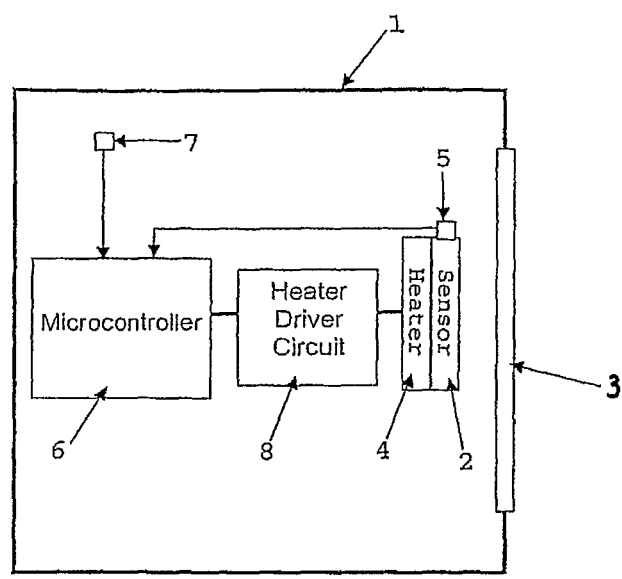

DETECTOR

RELATED APPLICATION

This application claims the benefit of the prior foreign application GB 0702284.1, filed Feb. 6, 2007. The entire teachings of the above application are incorporated herein by reference.

BACKGROUND OF THE INVENTION

This invention relates to a detector, and in particular to a flame detector provided with a sensor, such as a pyroelectric sensor, for detecting the presence of a flame.

A known flame detector includes either a single pyroelectric sensor or multiple pyroelectric sensors, either of which is sensitive to infrared radiation emitted by a flame source. The signal sensed by such a detector is analysed to determine if a flame has been detected. The pyroelectric sensor within the flame detector is sensitive to ambient temperature changes. A flame detector is typically mounted outdoors, and will experience a wide range of ambient temperatures owing, for example, to changing weather conditions. Thus, as the ambient temperature changes, a pyroelectric sensor will produce an output signal which varies with the change in temperature. Certain changes in ambient temperature can produce such a large signal from a pyroelectric sensor that it is the maximum signal it can output. This is undesirable, as detection of a flame cannot then occur. The pyroelectric sensor is more sensitive to temperature changes at low ambient temperatures; whereas, at higher ambient temperatures, greater temperature changes can be tolerated.

An aim of the invention is to provide a flame detector having one or more pyroelectric sensor(s) not susceptible to changes in ambient temperature. In particular, the invention aims to provide a flame detector having a pyroelectric array sensor and a control system for maintaining the temperature variation of the pyroelectric array sensor within predetermined limits, thereby to minimise the level of unwanted signals which result from ambient temperature changes.

It is generally advantageous that, owing to power distribution requirements in installations, the power consumed by a flame detector is kept to a minimum.

Consequently, a further aim of the invention is to provide means for controlling the temperature changes of the pyroelectric sensor, which control means uses minimum power.

SUMMARY OF THE INVENTION

The present invention provides a detector comprising a housing, a sensor mounted within the housing, a heater positioned adjacent to the sensor, and control means for varying the power supplied to the heater to control the temperature of the sensor relative to the ambient temperature in order to minimise the rate of change of the temperature of the sensor.

Advantageously, the arrangement is such that the control means controls the power supplied to the heater in such a manner as to adjust the temperature of the sensor to establish a predetermined difference above ambient temperature at a controlled rate, whilst minimising the power consumption of the detector.

Preferably, the predetermined difference between the temperature of the sensor and the ambient temperature is dependent upon the largest temperature change that the detector has been designed to sustain in its intended operating environment.

In a preferred embodiment, the control means is such as to vary the predetermined temperature difference according to the ambient temperature. Preferably, the control means is such that the predetermined temperature difference reduces to zero when the ambient temperature is sufficiently high that the sensor is able to cope with expected variations in the ambient temperature without power being supplied to the heater. The ambient temperature at which the offset is reduced to zero is determined by the actual sensitivity of that sensor.

Conveniently, the heater is fixed to one surface of the sensor.

In a preferred embodiment, the heater is constituted by at least one thick film resistive element printed onto said surface of the sensor. Alternatively, the thick film resistor is printed on the opposite surface of the sensor.

The control means may be constituted by a microcontroller which controls the supply of power to the heater via a heater drive circuit.

Preferably, the detector further comprises a first temperature sensor for sensing the temperature of the sensor, and a second temperature sensor mounted in the housing remote from the heater for sensing the temperature elsewhere in the detector. The temperature sensed by the second temperature sensor is hereinafter referred to as the ambient temperature. Importantly, the detector housing integrates external temperature fluctuations, thus reducing ambient temperature changes. The second (ambient) temperature sensor may be positioned so that it is effectively unaffected by the pyroelectric sensor heater. Both temperature sensors provide output signals to the microcontroller.

Advantageously, the microcontroller is programmed with software which permits the microcontroller to track the ambient temperature, to compare the ambient temperature with the temperature of the sensor, and to control the heater drive circuit to supply sufficient power to the heater to control the temperature of the sensor relative to the ambient temperature in order to minimise the rate of change of temperature of the sensor.

In order to accommodate changes in the ambient temperature, the microcontroller may be programmed so as to apply a nominal power level to the heater to maintain the temperature of the sensor at a predetermined offset above the ambient temperature. Under varying ambient temperatures, the microcontroller will then control the applied power to the heater to compensate for changes in the ambient temperature, in such a way as to keep the rate of change of temperature at the sensor within predetermined limits whilst aiming to maintain the temperature of the pyroelectric sensor at the predetermined temperature difference. The maximum rate of change allowed at the pyroelectric sensor is determined by the sensitivity of that sensor. In this connection, it will be appreciated that manufacturing tolerances will result in a given type of pyroelectric sensor having a sensitivity lying within a predetermined, small range. The maximum rate of change is, therefore, determined by the actual sensitivity of the sensor, rather than its rated sensitivity.

Preferably, the microcontroller is programmed so that the predetermined temperature difference is dependent on the largest temperature change that the detector has been designed to sustain in its intended operating environment. Conveniently, the microcontroller varies this temperature difference according to the ambient temperature. A typical range of temperature difference values would be from 20° C. to 30° C.

Advantageously, programming the microcontroller in this way minimises the power required by the heater in comparison to the power that would be required to keep the sensor at a fixed temperature.

In a preferred embodiment, the sensor is a flame detector sensor which is positioned within the housing adjacent to a window through which it can detect an external flame. Preferably, said one surface of the sensor faces away from the window, the opposite surface of the sensor constituting means for sensing an external flame.

In a preferred embodiment, the sensor is a pyroelectric array sensor.

DESCRIPTION

The invention will now be described in greater detail, by way of example, with reference to the drawing, the single figure of which is a schematic representation of a flame detector constructed in accordance with the invention.

Referring to the drawing, a flame detector has a housing 1 provided with a pyroelectric array sensor 2 for detecting the presence of a flame external to the detector through a window 3. A heater 4, constituted by thick film resistive elements, is printed on to one surface of the pyroelectric array sensor 2. A temperature sensor 5 is mounted on the pyroelectric array sensor 2, the temperature sensor 5 being linked to a microcontroller 6. A second temperature sensor 7 is also linked to the microcontroller 6. The microcontroller 6 controls the temperature of the heater 4 via a heater drive circuit 8. The temperature sensor 7 monitors the ambient temperature within the flame detector, whilst the temperature sensor 5 monitors the temperature of the pyroelectric array sensor 2.

The microcontroller 6 is programmed with software to implement a temperature control algorithm to maintain the pyroelectric array sensor 2 at a substantially stable temperature relative to ambient, thereby minimising temperature changes of the pyroelectric array sensor and hence minimising any output signal of the pyroelectric array sensor due to temperature changes of that sensor. This minimises the levels of unwanted signals that could be produced by the pyroelectric array sensor 2 due to changes of temperature within the detector housing 1.

The microcontroller 6 monitors the ambient temperature within the flame detector housing 1 using the second temperature sensor 7, the ambient temperature within the flame detector housing 1 changing when the outside temperature changes due, for example, to changing weather conditions. The algorithm provided by the software in the microcontroller 6 tracks the ambient temperature, and how it is changing, and compares this to the temperature of the pyroelectric array sensor 2. The algorithm then calculates how much power to apply to the heater 4 via the heater drive circuit 8 to control the rate of change of temperature applied to the pyroelectric array sensor 2 within a predetermined level and to keep a predetermined offset between the temperature of the pyroelectric array sensor and the ambient temperature. The software controlled microcontroller 6 is arranged to check the heater 4 regularly for correct operation, so that any heater failure that could affect the operation of the pyroelectric array sensor 2 can be reported to an external monitoring system (not shown). For the algorithm to work properly, the sensor 7 must be inside the housing 1, to provide the signal integration temperature which results from the thermal mass/insulation of the housing.

The microcontroller 6 is programmed with software which permits the microcontroller to track the ambient temperature, to compare the ambient temperature with the temperature of the pyroelectric array sensor 2, and to control the heater drive circuit 8 to supply sufficient power to the heater 4 to control the temperature of the pyroelectric array sensor relative to the ambient temperature in order to minimise the rate of change of temperature of that sensor.

In order to accommodate changes in the ambient temperature, the microcontroller 6 is programmed so as to apply a nominal power level to the heater 4 to maintain the temperature of the pyroelectric array sensor 2 at the predetermined offset above the ambient temperature. Under varying ambient temperatures, the microcontroller 6 will then control the applied power to the heater 4 to compensate for changes in the ambient temperature, in such a way as to keep the rate of change of temperature at the pyroelectric array sensor 2 within predetermined limits whilst aiming to maintain the temperature of that sensor at the predetermined offset above the ambient temperature.

The microcontroller 6 is further programmed so that the predetermined offset between the temperature of the pyroelectric array sensor 2 and the ambient temperature is dependent on the largest temperature change that the detector has been designed to sustain in its intended operating environment. A typical ranges of offset values is 20° C. to 30° C. The microcontroller 6 varies this offset according to the ambient temperature.

The offset will be reduced to zero when the ambient temperature is sufficiently high so that the sensor 2 is deemed able to cope with expected variations in the ambient temperature without power being supplied to the heater 4. The ambient temperature at which the offset is reduced to zero is determined by the actual sensitivity of the sensor 2.

It will be apparent that the detector described above is such that the pyroelectric array sensor 2 is maintained at a substantially stable temperature relative to ambient to enable the detector to operate with optimum performance. In this connection, the heater 4, which consists of thick film resistive elements printed on to the back of the pyroelectric array sensor 2, forms a low cost integrated heater/sensor arrangement. This results in the pyroelectric array sensor 2 being heated directly by the heater 4, and this is preferable to heating the whole enclosure, which would require considerably more power to control the temperature of the sensor. The integrated heater/sensor arrangement is also smaller and cheaper than a sensor and heater arrangement in which the heater has to heat the entire interior of the associated detector housing.

Although it is preferable to construct the heater in this manner, it will be appreciated that other forms of heater and heater control means could be used, though it would be preferable for any non-integral heater to be positioned adjacent to the pyroelectric array sensor 2.

Although the detector described above is designed specifically to detect a flame, it will be appreciated that the invention could be applied to infrared movement detectors or detectors which are used for counting and tracking objects or beings.

The invention claimed is:
1. A detector comprising:
a housing;
a flame detector sensor mounted within the housing and configured to detect an external flame;
a first temperature sensor configured to sense temperature of the flame detector sensor;
a second temperature senor configured to sense ambient temperature;
a heater positioned adjacent to the flame detector sensor; and a controller in communication with the first temperature sensor and the second temperature sensor, and configured to vary power supplied to the heater;
wherein the controller is further configured to:
compare the ambient temperature as indicated by the second temperature sensor to the temperature of the flame detector sensor as indicated by the first temperature sensor, wherein the ambient temperature is varying;
in response to the comparison, determine an amount of power to the heater in order to control a rate of change of the temperature of the flame detector sensor to be within a predetermined limit;
control the power supplied to the heater at the determined amount of power to change the temperature of the flame detector sensor at the rate of change to a different temperature so that the different temperature of the flame detector sensor is within a predetermined temperature difference relative to the varying in the ambient temperature.

2. A detector as claimed in claim 1, wherein the predetermined temperature difference is dependent upon the largest temperature change that the detector has been designed to sustain in its intended operating environment.

3. A detector as claimed in claim 1, wherein the controller is further configured to vary the predetermined temperature difference according to the ambient temperature.

4. A detector as claimed in claim 3, wherein the controller is further configured to reduce the predetermined temperature difference to zero when the ambient temperature is sufficiently high so as to allow the flame detector sensor to operate with expected variations in the ambient temperature without power being supplied to the heater.

5. A detector as claimed in claim 1, wherein the heater is fixed to one surface of the sensor.

6. A detector as claimed in claim 5, wherein the heater is constituted by at least one thick film resistive element printed onto said surface of the flame detector sensor.

7. A detector as claimed in claim 1, wherein the controller comprises a microcontroller which controls the supply of power to the heater via a heater drive circuit.

8. A detector as claimed in claim 7, wherein the second temperature sensor is mounted in the housing remote from the heater.

9. A detector as claimed in claim 8, wherein the first temperature sensing is integrated within the flame detector sensor.

10. A detector as claimed in claim 7, wherein the microcontroller is programmed with software which permits the microcontroller to track the ambient temperature, to compare the ambient temperature with the temperature of the flame detector sensor, and to control the heater drive circuit to supply sufficient power to the heater to control the temperature of the flame detector sensor relative to the ambient temperature in order to minimize the rate of change of temperature of the flame detector sensor.

11. A detector as claimed in claim 7, wherein the microcontroller is programmed so as to apply a nominal power level to the heater to maintain the temperature of the flame detector sensor at the predetermined temperature difference.

12. A detector as claimed in claim 7, wherein the microcontroller is programmed so as to minimize the power required by the heater to maintain the temperature of the flame detector sensor at the predetermined temperature difference.

13. A detector as claimed in claim 5, wherein said one surface of the flame detector sensor faces away from the window, the opposite surface of the flame detector sensor constituting means for sensing an external flame.

14. A detector as claimed in claim 1, wherein the flame detector sensor comprises a sensor array.

15. A detector as claimed in claim 1, wherein the controller is configured to track the ambient temperature and to determine how the ambient temperature is changing.

16. A detector as claimed in claim 1, wherein the controller is configured to dynamically select the predetermined temperature difference.

17. A detector as claimed in claim 16, wherein the controller is configured to dynamically select the predetermined temperature difference based on the ambient temperature.

18. A detector as claimed in claim 17, wherein the controller is configured to reduce the predetermined temperature difference to zero when the ambient temperature is a predetermined temperature.

19. A detector as claimed in claim 17, wherein the predetermined temperature difference is a non-zero difference.

20. A detector as claimed in claim 1, wherein the controller is configured to determine the rate of change based on a sensitivity of the flame detector sensor.

21. A detector as claimed in claim 1, wherein the second temperature sensor is positioned within the housing.

22. A detector as claimed in claim 1, wherein the housing comprises a window; and
wherein the flame detector sensor is mounted within the housing relative to the window through which the flame detector sensor is configured to detect an external event.

23. A detector as claimed in claim 22, wherein the external event comprises an external flame.

* * * * *